US007716669B2

(12) United States Patent
Simon et al.

(10) Patent No.: US 7,716,669 B2
(45) Date of Patent: May 11, 2010

(54) CONCURRENT SYSTEM APPLICATIONS IN A MULTIMEDIA CONSOLE

(75) Inventors: Jeffrey Edward Simon, Sammamish, WA (US); Jon Marcus Randall Whitten, Sammamish, WA (US); Yasser B. Asmi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1586 days.

(21) Appl. No.: 10/836,411

(22) Filed: Apr. 30, 2004

(65) Prior Publication Data

US 2005/0246709 A1 Nov. 3, 2005

(51) Int. Cl.
*G06F 9/46* (2006.01)
(52) U.S. Cl. ...................................... 718/104; 718/100
(58) Field of Classification Search ................. 718/100, 718/102, 104, 1; 463/2
See application file for complete search history.

(56) References Cited

U.S. PATENT DOCUMENTS

| | | | | | |
|---|---|---|---|---|---|
| 5,268,682 | A | * | 12/1993 | Yang et al. | 345/554 |
| 5,297,286 | A | * | 3/1994 | Uehara | 713/1 |
| 6,078,942 | A | | 6/2000 | Eisler et al. | 709/100 |
| 6,128,713 | A | | 10/2000 | Eisler et al. | 711/159 |
| 6,202,060 | B1 | * | 3/2001 | Tran | 707/3 |
| 6,345,293 | B1 | | 2/2002 | Chaddha | 709/219 |
| 6,370,606 | B1 | * | 4/2002 | Bonola | 710/260 |
| 6,401,211 | B1 | | 6/2002 | Brezak, Jr. et al. | 713/201 |
| 6,526,416 | B1 | | 2/2003 | Long | 707/202 |
| 6,622,233 | B1 | * | 9/2003 | Gilson | 712/11 |
| 6,718,360 | B1 | | 4/2004 | Jones et al. | 709/107 |
| 6,832,236 | B1 | * | 12/2004 | Hamilton et al. | 718/100 |
| 6,954,757 | B2 | * | 10/2005 | Zargham et al. | 707/101 |
| 7,243,167 | B2 | * | 7/2007 | Zimmer et al. | 710/10 |
| 7,356,817 | B1 | * | 4/2008 | Cota-Robles et al. | 718/1 |
| 2001/0016879 | A1 | * | 8/2001 | Sekiguchi et al. | 709/319 |
| 2002/0099921 | A1 | * | 7/2002 | Bonola | 711/170 |
| 2005/0223383 | A1 | * | 10/2005 | Tetrick | 718/104 |

FOREIGN PATENT DOCUMENTS

WO  WO 9401824 A1 * 1/1994
WO  WO 01/75602 A2   10/2001

OTHER PUBLICATIONS

Deng et al. ("Dynamic scheduling of hard real time application in open system environment", ACM, 1996, pp. 1-4).*

(Continued)

*Primary Examiner*—Meng-Ai An
*Assistant Examiner*—Caroline Arcos
(74) *Attorney, Agent, or Firm*—Woodcock Washburn LLP

(57) ABSTRACT

An operating system architecture that provides a high level of system functionality in a multimedia console through the use of concurrent system applications, while reducing the lack of control that multimedia applications have while running on the console. At power ON, a predetermined amount of system resources are reserved within which the concurrent system applications execute. The multimedia applications are afforded control over the unreserved system resources and do not need to support system functionalities as the concurrent system applications provide system functionalities to end users.

20 Claims, 4 Drawing Sheets

OTHER PUBLICATIONS

Brandt et al. (A dynamic quality of service Middleware agent for mediating application resource usage, IEEE, 1998, pp. 1-11).*

Plagemann et al., "Operating system support for multimedia systems", Elsevier Science, 1999, p. 1-26.*

Jones, M.B. et al., "CPU Reservations and time Constraints: Efficient, Predictable Scheduling of Independent Activities", http://research.microsoft.com/~mbj/papers/sosp97/sosp97.html, Feb. 24, 2004, 24 pages.

Kalavade, A. et al., "AsaP-A Framework for Evaluating Run-time Schedulers in Embedded Multimedia End-Systems", *ACM*, 1998, 291-296.

Nieh, J. et al., "A SMART Scheduler for Multimedia Applications", *ACM Transactions on Computer Systems*, May 2003, 21(2), 117-163.

Poellabauer, C. et al., "Coordinated CPU and Event Scheduling for Distributed Multimedia Applications", *MM*, 2001, 231-240.

Tivo® Remote Control, Hints and Shortcuts, Inserting Batteries in the remote Control, Setting up the Remote to Control your TV, The TiVo Menus and the remote Control, 2 Pages.

Waldspurger, C.A., "Memory Resource Management in VMware ESX Server", *5$^{th}$ Symposium on Operating Systems Design and Implementation(OSDI)*,Dec. 9-11, 2002, 181-194.

Bollella, G. et al., "Support for Real-Time Computing within General Purpose Operating Systems", *IEEE Computer Society*, 1995, 4-14, XP-002446913.

Bollella, G., "Slotted Priorities: Supporting Real-Time Computing Within General-Purpose Operating Systems", http://www.cs.unc.edu, XP-002446930, Chapter 3, 51-112.

Mercer, C.W. et al., "Processor Capacity Reserves: Operating System Support for Multimedia Applications", *Proceedings of the International Conference on Multimedia Computing and Systems*, 1994, 90-99, XP002089219.

* cited by examiner

CONCURRENT SYSTEM APPLICATIONS IN A MULTIMEDIA CONSOLE

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright® 2004, Microsoft Corporation, All Rights Reserved.

FIELD OF THE INVENTION

This invention generally relates to the field of multimedia devices. In particular, the present invention is directed to an operating system architecture that provides additional system functionalities within a multimedia device, while maximizing the control afforded to applications running on the multimedia device.

BACKGROUND OF THE INVENTION

Multimedia devices, such as video game consoles, have traditionally provided an operating system that "gets out of the way" of the developer. In particular, in conventional video game consoles the game developers are provided with near total control of the hardware and the operating system is driven by the multimedia application. As game software is often developed for a particular platform, the available hardware resources (e.g., memory, processor speed, etc.) are well known. This architecture provides developers complete autonomy and insight into how every CPU cycle is used. Thus, software developers can manage and maximize the usage of the hardware resources and provide a high performance multimedia application. There is a significant drawback to this approach in that system services are severely constrained and require explicit direction by the application. This direction is necessary because there is only one application running on the system at any point in time (i.e., the multimedia application). Another drawback is because each application provides its own interface to system resources, the user's experience may differ significantly from application to application. Yet another drawback is that the operating system functionality cannot be updated over time in conventional multimedia devices.

The other end of the continuum of resource control is found in the conventional personal computer (PC), in which applications typically have limited control over the underlying functionality of the operating system. This approach provides a large amount of functionality in the operating system, without requiring that it be controlled by the application. Further, this provides for multiple applications to run simultaneously without requiring them to be aware of each other. The drawback of this approach is that an application has much less control over system resources, such as CPU cycles, RAM, network bandwidth, etc., and has to be architected to assume that it is not the only application running.

As multimedia devices grow in power there will be a greater demand to provide system services to applications while maintaining the benefits of existing multimedia console operating systems where developers have almost full control of system resources. Thus, there is a need for a system and method of providing system services in a multimedia device to enable more functionalities, while maintaining an application's high level of control over the operating system and hardware resources. The present invention provides such a solution.

SUMMARY OF THE INVENTION

The present invention is directed to an operating system architecture that addresses the limitations inherent in extending existing multimedia console operating systems to provide more system functionality through concurrent system applications, while minimizing the lack of control that applications have in conventional personal computing (PC) operating systems. In accordance with the present invention, multimedia applications do not need to support system functionalities as required in conventional systems. The concurrent system applications provide system functionalities while a multimedia application is running, and may be implemented in other constrained environments such as set-top boxes, embedded systems, etc.

In accordance with an aspect of the invention there is provided a multimedia console having a central processing unit, a graphics processing unit, a writable memory in communication with the graphics processing unit, and a memory in communication with the central processing unit. The memory contains executable code for reserving system resources within which concurrent system applications that provide system services are executed. In addition, system applications run concurrently with a multimedia application executing on the multimedia console, where the multimedia application controls system resources that are not reserved by the executable code.

In accordance with a feature of the invention, the concurrent system applications are executed in accordance with a schedule to utilize a substantially constant level of system resources. In addition, the concurrent system applications are upgradeable independent of the multimedia applications intended for use on the multimedia console. Further, the system services are provided by the concurrent system applications and are accessible without management by the multimedia application. This aids in providing a consistent interface and user experience across different multimedia applications running on the multimedia console.

In accordance with another aspect of the invention, there is provided a method of providing concurrent system applications in a multimedia console that includes reserving a predetermined amount of hardware resources after the multimedia console is powered ON; executing the concurrent system applications within the predetermined amount of hardware resources; executing a multimedia application substantially within an amount of unreserved system resources; and providing system functionalities without management by the multimedia application.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
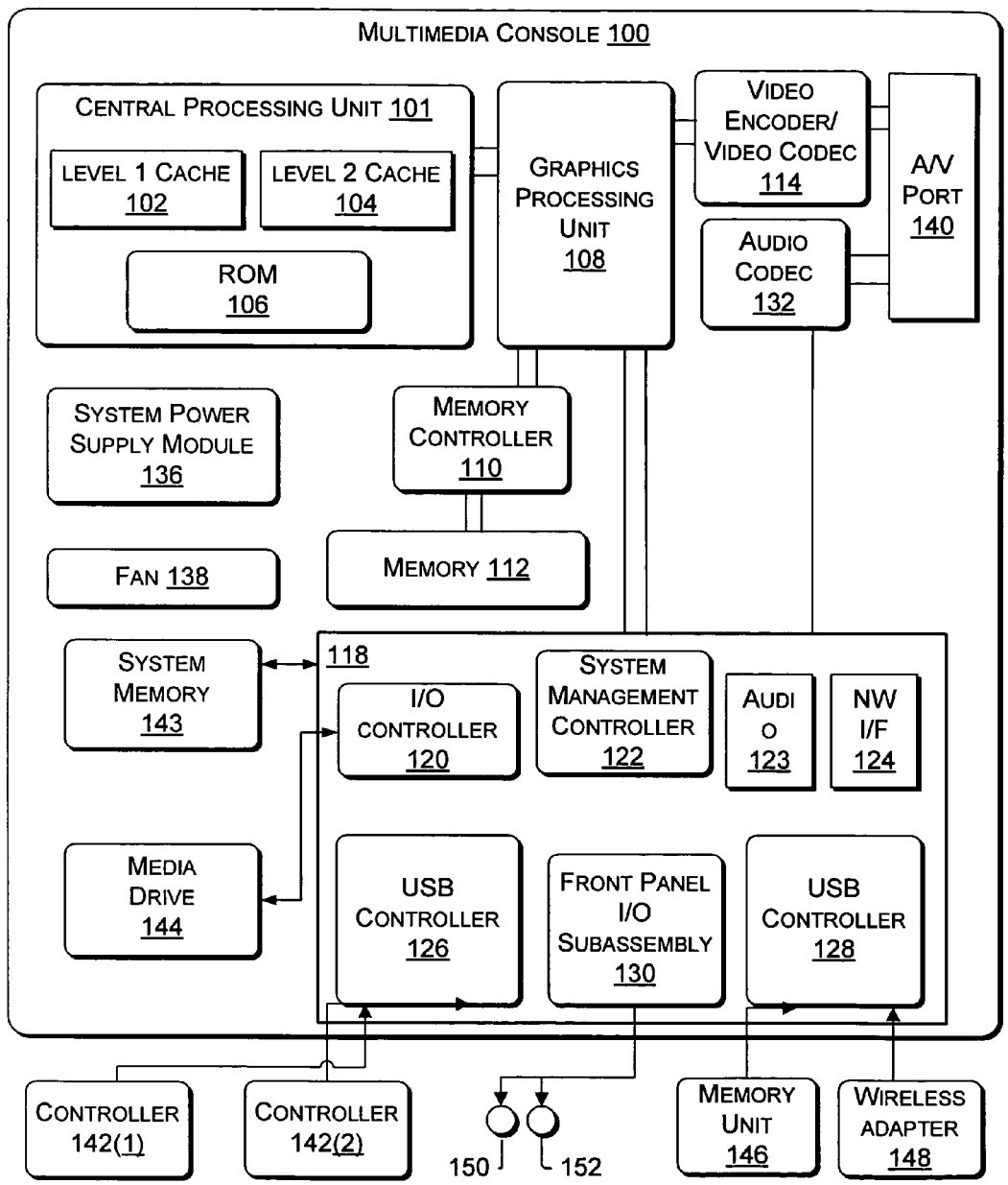
FIG. 1 is a block diagram showing a multimedia console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 136 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

The present invention provides an integrated application/operating system solution that advantageously satisfies both of the positives of the two architectures described above while minimizing the negatives. Unlike existing multimedia console operating systems, this invention does not require developers to explicitly incorporate or handle user access to system functionality. By providing access to system functionality via concurrent system applications, users obtain the concurrent application and rich system functionality benefits as in PC operating systems, without indeterminately taking control of system resources away from the multimedia application.

Figure 2:
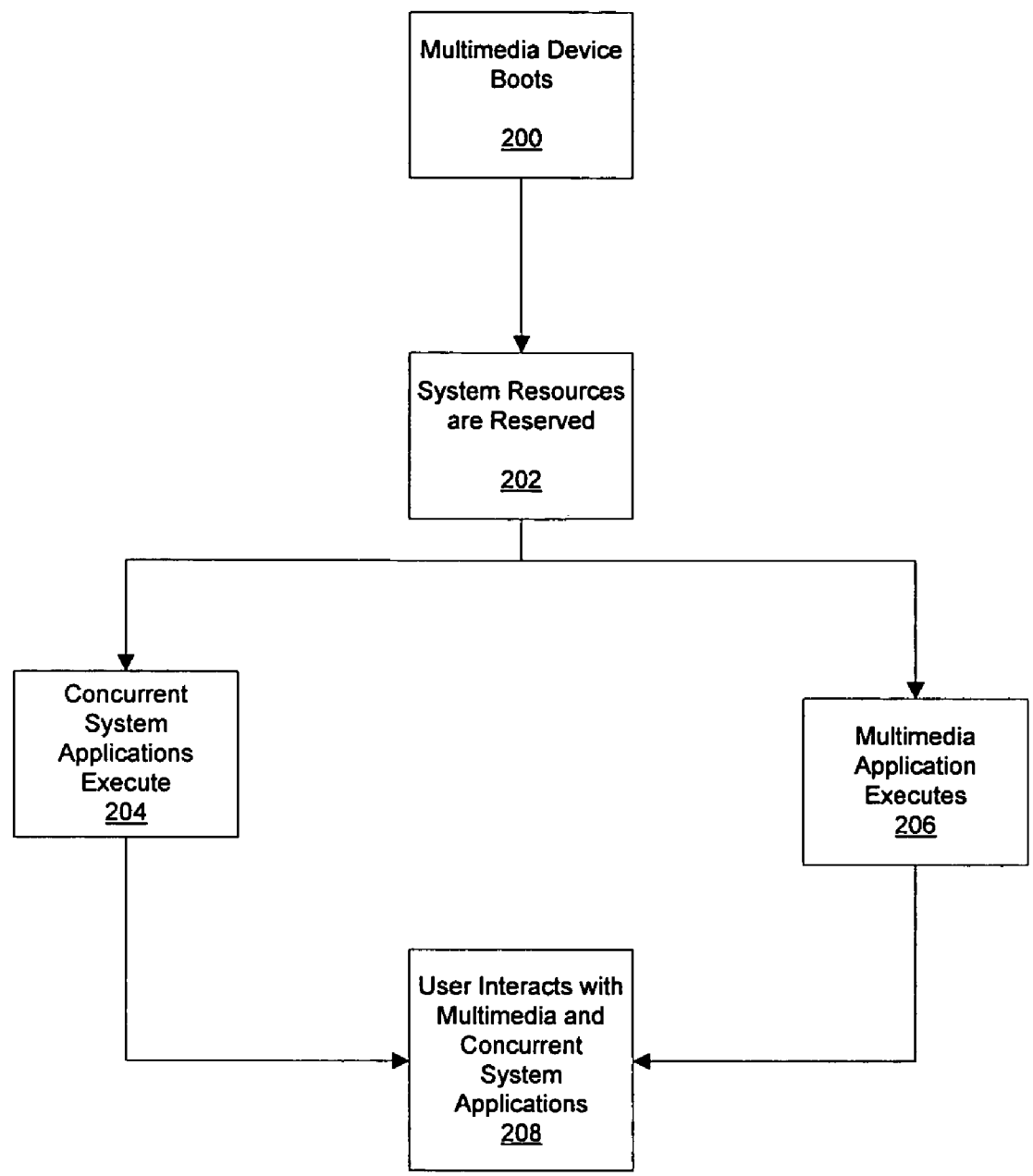
FIG. 2 is a flowchart of the processes performed according to an aspect of the invention.

Referring now to FIG. 2, there is illustrated an overview of system resource reservation process in accordance with the present invention to enable concurrent system applications. As illustrated in FIG. 2, when the multimedia console 100 is powered ON (step 200), a set amount of hardware resources are reserved for system use by the multimedia console operating system (step 202). These resources may include a reservation of memory (e.g., 16 MB), CPU and GPU cycles (e.g., 5%), networking bandwidth (e.g., 8 kbs), etc. It is noted that this exemplary set of resources is not intended to be a limiting or an exhaustive list of system resources that may be reserved in accordance with the present invention. Because these resources are reserved at system boot time, the reserved resources do not exist from the application's view.

In particular, the memory reservation preferably is large enough to contain the launch kernel, concurrent system applications and drivers. This reservation preferably allows for new concurrent system applications and drivers over the life of the multimedia console, as well as any anticipated expansion in the size of the concurrent system applications and driver footprint. The CPU reservation amount is maintained at a substantially constant level.

With regard to the GPU reservation, lightweight messages generated by the concurrent system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of game resolution. A scaler may be used to set this resolution such that the need to change frequency and cause a TV resynch is eliminated.

After the multimedia console 100 boots and system resources are reserved, concurrent system applications execute (step 204) to provide system functionalities to multimedia applications and end users. The system functionalities are encapsulated in a set of concurrent system applications that execute within the reserved system resources described above with reference to step 202. The operating system kernel identifies threads that are concurrent system application threads versus multimedia application threads. The concurrent system applications are preferably scheduled to run on the CPU 101 at predetermined times and intervals in order to provide a consistent system resource view to the application. The scheduling preferably minimizes cache disruption for the multimedia application running on the console 100. It is preferable that the deployment and installation of the concurrent system applications are controlled to ensure consistency for the multimedia applications that will be run on the console 100.

When a concurrent system application requires audio, audio processing is scheduled asynchronously to the multimedia application due to time sensitivity. A multimedia console application manager (described below) controls the multimedia application audio level (e.g., mute, attenuate) when concurrent system applications are active.

Input devices (e.g., controllers 142(1) and 142(2)) are shared by multimedia applications and concurrent system applications. The input devices are not reserved resources, but are to be switched between the concurrent system applications and the multimedia application such that each will have the focus of the device. The application manager preferably controls the switching of input stream, without the multimedia application's knowledge and a driver maintains state information regarding focus switches.

As noted above, the concurrent system applications provide system functionality as the multimedia application executes (step 206), and do not require any support from the multimedia application. One or more applications may be executing at step 206. The user may interact with either the concurrent system application or multimedia application (step 210) as desired. Where existing operating system architectures require that multimedia application manage this dual-functionality, providing concurrent system applications to perform these tasks with the multimedia application does not require the multimedia application to manage this functionality. By reserving system resources for concurrent system applications in accordance with the present invention, the requirement for multimedia applications to interact with the operating system to provide services is significantly reduced.

Figure 3:
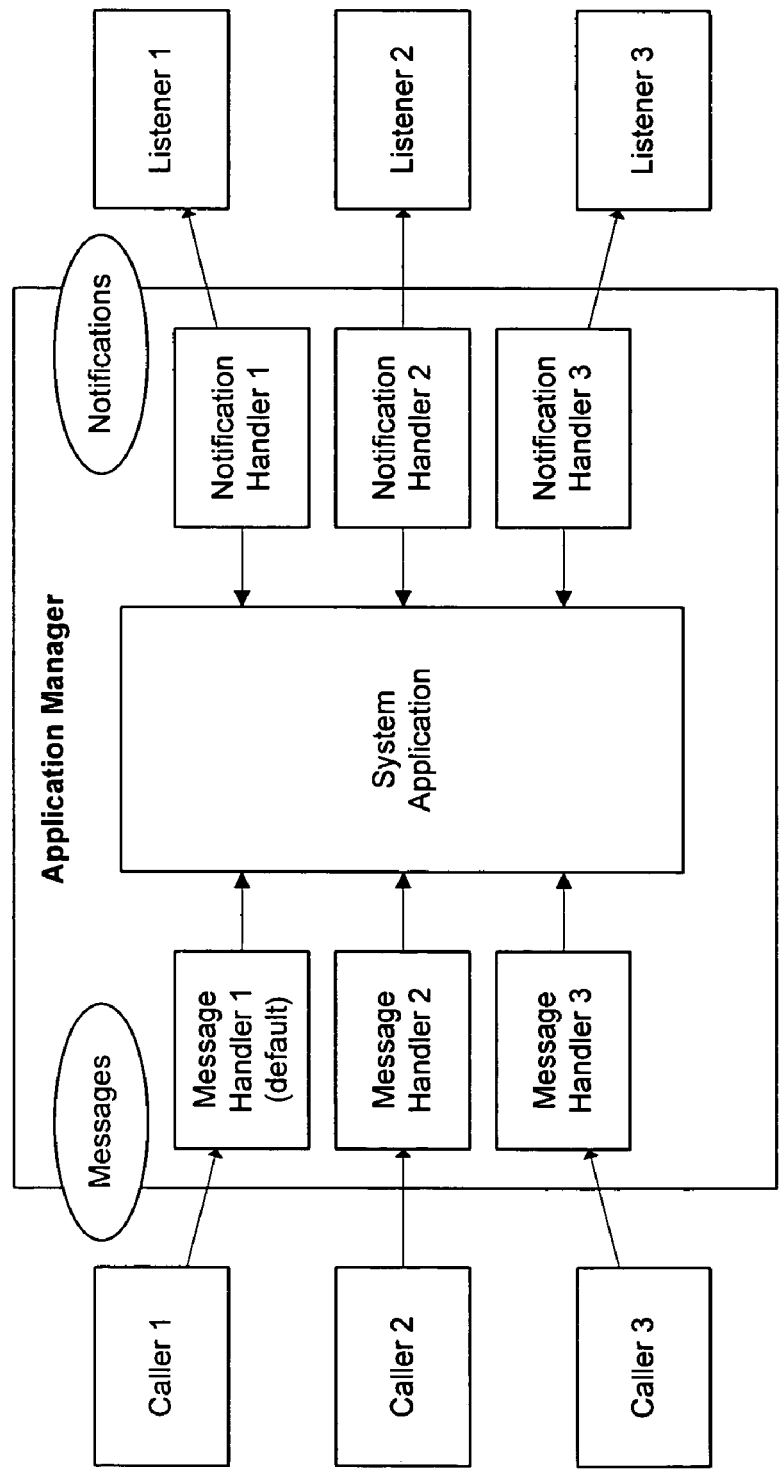
FIG. 3 is an block diagram illustrating an application manager.

Referring to FIG. 3, there is illustrated the application manager and its relationship to the concurrent system applications and multimedia applications. The communication to concurrent system applications is preferably message based. APIs are exposed to the multimedia applications that wrap messages. Communication from the concurrent system applications is notification based. Multiple listeners and multiple callers are supported using small proxy objects.

Figure 4:
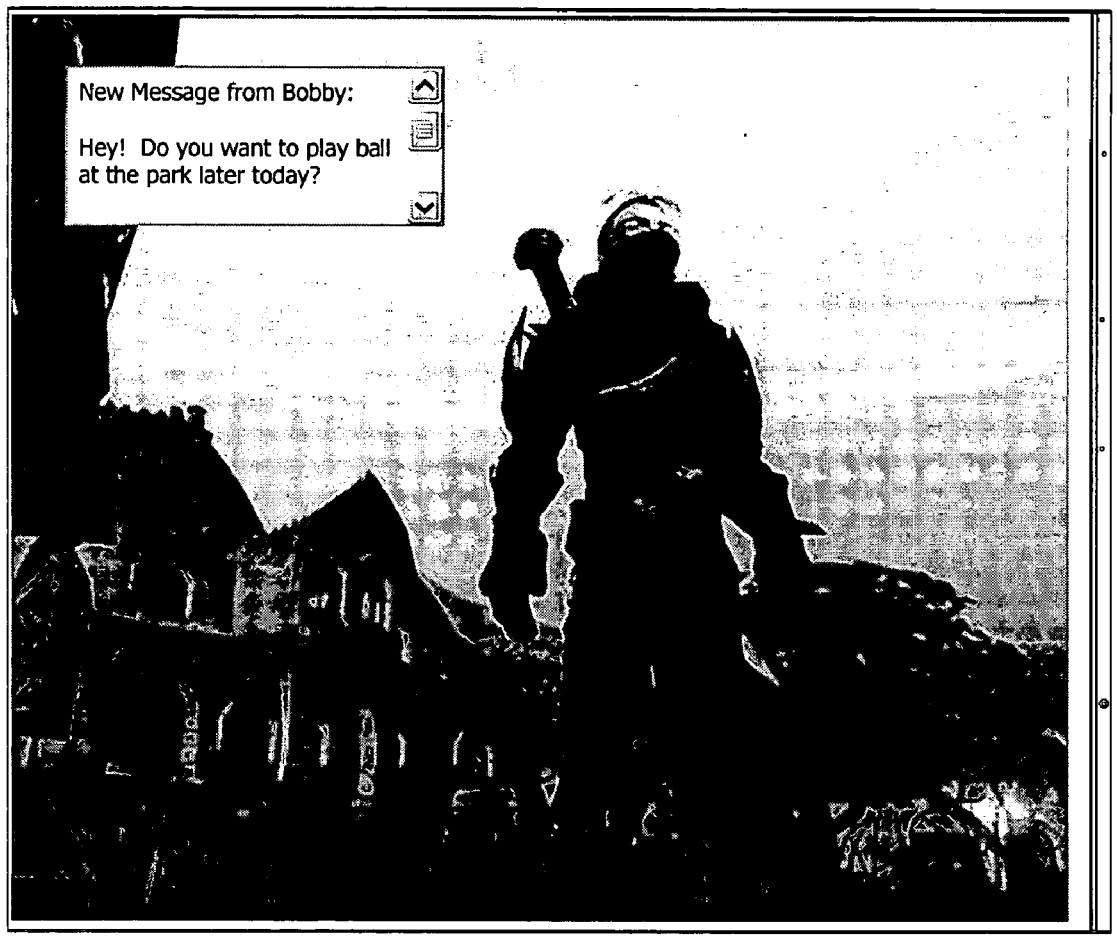
FIG. 4 is an exemplary user interface illustrating the concurrent system application executing with a multimedia application.

Referring to FIG. 4, there is an example of a concurrent system application that allows enumeration of, viewing of, and communicating with a user's online friends. The exemplary concurrent system application of FIG. 4 is running concurrently with the multimedia application and presents an overlay user interface to enable the user to communicate with his/her friends while the multimedia application continues execution. Other concurrent system applications may be provided such as an e-mail, a browser application, an audio playback application, etc. In addition, other types of interaction are possible, such as pausing the multimedia application when the user interacts with the concurrent system application, etc.

An advantageous benefit of the present invention is that concurrent system application functionality can be upgraded (via the media drive, network interface, or wireless adapter, etc.) without requiring redeployment of the multimedia application. Thus, new features and functions can be added to the multimedia device independent of the applications that run on the devices. Such an upgrade option does not exist in conventional multimedia consoles due to the statically linked nature of the multimedia applications and operating system.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A multimedia gaming console, comprising:
a central processing unit, upon which concurrent system applications are executed to provide system services for the console and upon which a multimedia gaming application is executed to provide a multimedia gaming experience to a user of the console, wherein:
the concurrent system applications are executed in accordance with a schedule to utilize a constant level of system resources;
the system services are provided using a consistent interface across different multimedia applications running on the multimedia console; and
a reservation of a graphics processor utilization is performed and messages generated by said concurrent system applications are displayed by using a graphics processor interrupt;
a graphics processing unit;
a writable memory in communication with said graphics processing unit; and
a memory in communication with said central processing unit,
said memory having thereon executable code for reserving system resources for use by the concurrent system applications, including a predetermined amount of processor utilization as provided by the central processing unit, a predetermined amount of networking bandwidth as provided by a network to which the gaming console is communicatively coupled, and a predetermined amount of processor utilization as provided by the graphics processing unit; and
said system applications executing concurrently with the multimedia application on said multimedia console, said multimedia application controlling system resources that are not reserved by said executable code and not controlling system resources that are reserved by the executable code, at least some of the system applications providing system functionalities to the multimedia application and the user.

2. The multimedia console of claim 1, wherein said concurrent system applications are upgradeable independent of said multimedia application.

3. The multimedia console of claim 1, wherein said system services provided by said concurrent system applications are accessible without management by said multimedia application.

4. The multimedia console of claim 1, wherein said reserving of system resources includes reserving a predetermined amount of memory.

5. The multimedia console of claim 1, wherein said processor reservation is constant.

6. The multimedia console of claim 1, wherein a user interface is provided independent of a resolution of said multimedia application and a screen rate of said multimedia application is reduced.

7. The multimedia console of claim 1, further comprising an application manager that manages and schedules said concurrent system applications and said multimedia application, said application manager providing messaging between said concurrent system applications and exposing an API to said multimedia applications.

8. The multimedia console of claim 7, wherein input devices are shared by said multimedia application and said concurrent system applications.

9. In a multimedia gaming console having a central processing unit, a graphics processing unit, a writable memory in communication with said graphics processing unit, and a memory in communication with said central processing unit, a method of providing concurrent system applications, comprising:

reserving a predetermined amount of hardware resources after the multimedia console is powered ON, the reserved resources for use by the concurrent system applications and including a predetermined amount of processor utilization as provided by the central processing unit, a predetermined amount of networking bandwidth as provided by a network to which the gaming console is communicatively coupled, and a predetermined amount of processor utilization as provided by the graphics processing unit, wherein:

the concurrent system applications are executed in accordance with a schedule to utilize a constant level of system resources;

the system services are provided using a consistent interface across different multimedia applications running on the multimedia console; and a reservation of a graphics processor utilization is performed and messages generated by said concurrent system applications are displayed by using a graphics processor interrupt;

executing said concurrent system applications within said reserved predetermined amount of hardware resources to provide reserved system services for the console;

executing a multimedia gaming application within an amount of unreserved system resources to provide a multimedia gaming experience to a user of the console, the executing multimedia application controlling system resources that are not reserved and not controlling the reserved hardware resources; and providing system functionalities from the systems applications to the multimedia application and the user without management by said multimedia application.

10. The method of claim 9, wherein reserving said predetermined amount of hardware resources comprises reserving a predetermined amount of memory.

11. The method of claim 9, wherein said method further comprises maintaining said processor utilization at a constant amount.

12. The method of claim 9, further comprising:
providing a user interface independent of a resolution of said multimedia application.

13. The method of claim 9, further comprising:
providing an application manager that manages and schedules said concurrent system applications and said multimedia application, said application manager providing messaging between said concurrent system applications and exposing an API to said multimedia applications.

14. The method of claim 13, further comprising sharing input devices between said multimedia application and said concurrent system applications via said application manager.

15. A computer-readable storage medium having computer-executable instructions that when executed by a computer, instruct a multimedia gaming console to perform the steps of:

reserving a predetermined amount of hardware resources after the multimedia console is powered ON, the reserved resources for use by concurrent system applications on the gaming console and including a predetermined amount of processor utilization as provided by a central processing unit of the gaming console, a predetermined amount of networking bandwidth as provided by a network to which the gaming console is communicatively coupled, and a predetermined amount of processor utilization as provided by a graphics processing unit of the gaming console, wherein the concurrent system applications are executed in accordance with a schedule to utilize a constant level of system resources;

the system services are provided using a consistent interface across different multimedia applications running on the multimedia console; and a reservation of a graphics processor utilization is performed and messages generated by said concurrent system applications are displayed by using a graphics processor interrupt;

executing said concurrent system applications within said reserved predetermined amount of hardware resources to provide reserved system services for the console;

executing a multimedia gaming application within an amount of unreserved system resources to provide a multimedia gaming experience to a user of the console, the executing multimedia application controlling system resources that are not reserved and not controlling the reserved system resources; and providing system functionalities from the system applications to the multimedia application and the user without management by said multimedia application.

16. The computer-readable storage medium of claim 15, further having computer-executable instructions for instructing a multimedia device to reserve a predetermined amount of memory.

17. The computer-readable storage medium of claim 15, further having computer-executable instructions for instructing a multimedia device to reserve a constant amount of processor utilization.

18. The computer-readable storage medium of claim 15, further having computer-executable instructions for:
providing a user interface independent of a resolution of said multimedia application.

19. The computer-readable storage medium of claim 15, further having computer-executable instructions for:
provinding an application manager that manages said concurrent system applications and said multimedia application, said application manager providing messaging between said concurrent system applications and exposing an API to said multimedia applications.

20. The computer-readable storage medium of claim 19, further having computer-executable instructions for:
sharing input devices between said multimedia application and said concurrent system applications via said application manager.

\* \* \* \* \*

UNITED STATES PATENT AND TRADEMARK OFFICE
CERTIFICATE OF CORRECTION

| | | |
|---|---|---|
| PATENT NO. | : 7,716,669 B2 | |
| APPLICATION NO. | : 10/836411 | |
| DATED | : May 11, 2010 | |
| INVENTOR(S) | : Jeffrey Edward Simon et al. | |

It is certified that error appears in the above-identified patent and that said Letters Patent is hereby corrected as shown below:

In column 8, line 31, in Claim 15, after "wherein" insert -- : --.

Signed and Sealed this
Eighth Day of February, 2011

David J. Kappos
*Director of the United States Patent and Trademark Office*